(No Model.)

L. H. SMITH.
VESSEL FOR MEASURING AND TRANSFERRING LIQUIDS.

No. 341,066. Patented May 4, 1886.

Witnesses:
Charles Seekins
James M. Shallus

Lewis H. Smith
Inventor:
by his Attorney
Alex. Selkirk

UNITED STATES PATENT OFFICE.

LEWIS H. SMITH, OF ALBANY, NEW YORK.

VESSEL FOR MEASURING AND TRANSFERRING LIQUIDS.

SPECIFICATION forming part of Letters Patent No. 341,066, dated May 4, 1886.

Application filed June 29, 1885. Serial No. 170,194. (No model.)

*To all whom it may concern:*

Be it known that I, LEWIS H. SMITH, a citizen of the United States, residing at Albany, in the county of Albany and State of New York, have invented certain new and useful Improvements in Vessels for Measuring and Transferring Liquids, of which the following is a specification.

My invention relates to improvements in vessels for measuring and transferring liquids, in which the measuring-vessel is provided with a gage, and a funnel-form bottom provided with a valve which can be operated at will, and also with an adjustable stand for support of the vessel when being filled, and an upper funnel to facilitate the filling of the vessel without liability of its being overflowed, all of which will be hereinafter fully described.

The objects of my invention are to provide the vessel with a measuring-gage, by which the quantity of liquid therein can be readily known, and to provide a funnel-shape bottom having a valve, by which the liquid can be readily run out or be stopped at will, and to provide an adjustable stand which can be set at will to support the vessel while it is being filled, and be moved out of such position to permit the vessel to be applied to a can or other vessel when the liquid is to be transferred. I attain these objects by the means illustrated in the accompanying drawings, in which—

Figure 1:
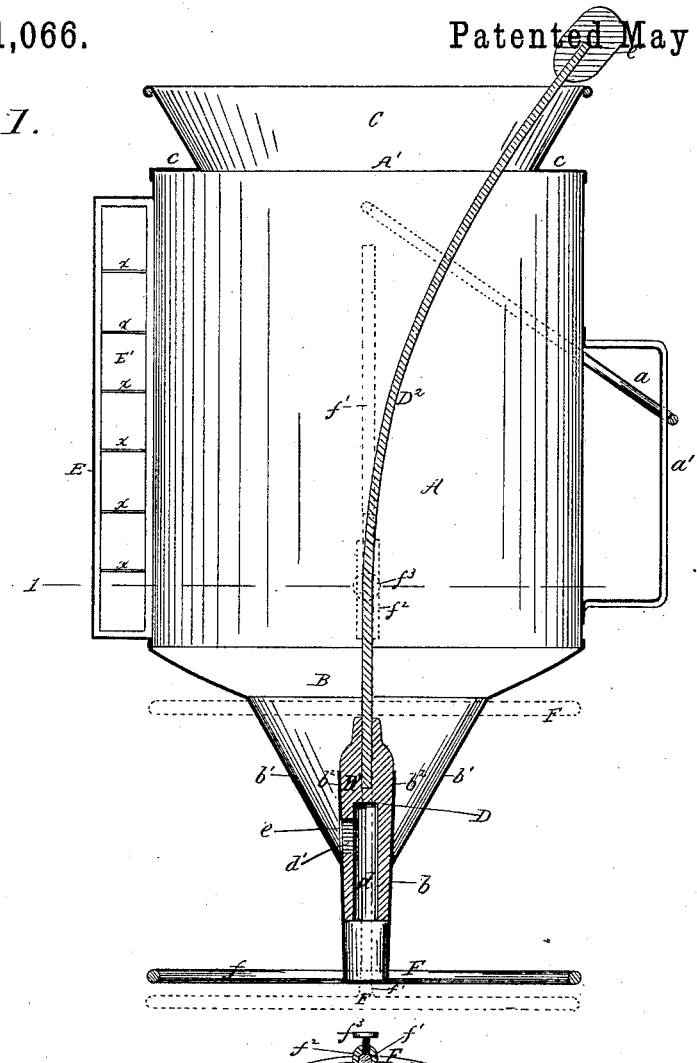
Figure 2:
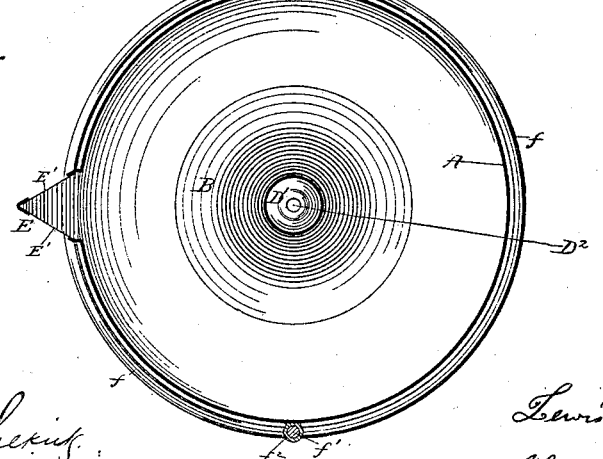

Figure 1 is a sectional elevation of my improved measuring and transferring vessel. Fig. 2 is a horizontal view taken at line 1 in Fig. 1.

The same letters of reference refer to like parts throughout the several views.

A is the vessel, made, preferably, of sheet metal, with any preferred capacity, as for holding one, two, or five gallons, (more or less,) and $a$ is the bail-handle, and $a'$ a side handle.

B is the bottom, made with a funnel-shaped form, and provided with discharge-nozzle $b$.

C is a gradually-tapering guard-wall, having its lower end connecting with horizontal top wall, $c$, of the body proper of the vessel. This top wall is concentric with the opening A' in the lower end of said guard or wall, and is the limit of the capacity of the vessel, and the guard C permits the vessel being filled without overflowing, and permits also a good measure of liquids to be taken in a charge of the vessel, so as to make up for the amount of the liquid which may (when of thick nature, as molasses) adhere to the sides of the vessel.

D is a valve provided in the lower portion of funnel-bottom B of the vessel. The drawings show that the wall of the nozzle $b$ is extended upward above the lower end of the wall $b'$ of this funnel-bottom, to a short distance, as wall portion $b^2$. The interior or bore of this extended nozzle $b$ is made slightly tapering, and with a circular form, so as to adapt it to receive a plug or spigot for opening or closing it at will. The plug D' is shown to be in the form of a spigot, provided with a vertical perforation, $d$, communicating with the horizontal perforation $d'$, which communicates with the chamber of the funnel-bottom B through an opening, $e$, made in a side of the extended portion $b^2$ of nozzle $b$. This plug is provided with a handle, $D^2$, by which it is operated. With the form of plug shown I make handle $D^2$ with a curved form, preferably, so that the handle will operate substantially as a crank-handle for revolving the plug in its seat in nozzle $b$, and its finger end $e'$ be at the wall of guard C at all times, so that it will not be liable to receive on it any liquid which may be drawn into the vessel.

In some cases (as in vessels made wholly of glass) I would omit the extension of the nozzle upward past the lower end of wall $b$ of the funnel-bottom B, and employ a plain plug, made, preferably, of cork, and secured to handle $D^2$, whereby the plug can be turned in its seat and withdrawn at will, when it is desired to discharge the liquid, and be readily closed by inserting the plug.

E is a transparent gage provided with suitable division-lines, $x$, or other suitable scale or gage marks or devices, which will indicate smaller denominational measures or fractional measures of gallons, quarts, or pints, or of pounds or ounces, as may be preferred, and be best adapted for use in the particular employment of the vessel as a measure for liquids or fluids. The drawings show this gage to be made with a bay form, and with its transparent walls E' E' set at an angle in relation to each other. Though this form of gage is preferred in most cases to be made with angular sides, so that the measures of liquids within the vessel can be readily viewed from the sides as well as the front of the gage, yet it will be seen that a flat transparent section of wall at a line with the wall proper of the vessel may be substituted, or that any other known form of gage employed to show the volume of liquids in vessel may be used.

F is an adjustable stand composed of a foot-piece, $f$, and standards $f'$ $f'$, working in suitable sleeves, $f^2$, and held by set-screw or set-screws $f^3$. The foot-piece is shown to be circular in form, and standards $f'$ (shown by dotted line in Fig. 1, and by full lines in Fig. 2) are shown to be cylindrical in form, though the former may be made with some other form and the latter with a flat or square form in cross-area, if preferred; or the sleeves $f^2$ can be dispensed with, and the standards made with a flat and wide form, and provided with a long slot, receiving a guiding-tongue secured as a substitute for the sleeves to the sides of the vessel, with a set screw or screws, can be employed to permit the stand being adjusted in a vertical direction in relation to the vessel, the object being to provide suitable means for supporting the vessel from the floor while it is being filled, and moving this support upward past the upper end of the nozzle $b$, so that the foot-piece will permit the latter to be readily inserted in the mouth of a jug, can, or bottle to which the measured quantity of liquid is to be transferred.

In operating with this vessel the operator, if the vessel be large or the liquid to be drawn is thick, will let the foot of stand F down below the lower end of nozzle $b$ and secure the same, and thereby support the vessel from the floor. He will close the nozzle $b$ by means of the handled plug or valve D, and then run into the vessel the amount of liquid to be measured and transferred, and by means of bail-handle $a$ or side handle, $a'$, he will lift the vessel from the floor, and will also raise the foot of the stand above the upper end of the nozzle of the funnel-bottom and place the nozzle into the mouth of the can or jug, or other receiving-vessel, substantially as is the practice with funnels, and by handle $D^2$ operate the plug or spigot of the valve to open the same and permit the liquid to run down through nozzle $b$ into the can or other receiving-vessel.

With the above-described improvements the operator can fill several smaller vessels with each a uniform measure of liquid from the same charge of a large measuring-vessel, by simply operating the valve to open and close the same at each application of the vessel to the several smaller receiving ones, when made successively at gage measure.

By my improvements the one vessel operates as a measuring device and as a transferring device, which is operated at will in a convenient manner and in a cleanly way, and without liability of the customer receiving less than good measure or the seller losing or wasting or spilling any portion of the liquor on the floor.

Having described my invention, what I claim, and desire to secure by Letters Patent, is—

1. In a vessel for measuring and transferring liquids, provided with a nozzle having a valve which is operated at will for opening and closing said nozzle, the bay-form measuring-gage E, having angular sides projecting outward from the walls of the vessel, substantially as and for the purpose set forth.

2. In a measure for liquids, the combination, with the body of the vessel, provided with a funnel-form bottom having a discharge-nozzle provided with a valve, of the adjustable supporting device above described, and adjustable at will to a line on or about at the plane of the discharge end of said discharge-nozzle, substantially as and for the purposes set forth.

3. The combination, with vessel A, provided with a funnel-form bottom having a discharge-nozzle, and with a lifting-handle, of an adjustable stand, F, connected by standards with the body of the vessel, and provided with guiding-pieces and a set screw or screws for securing the stand to any adjusted position, substantially as and for the purposes set forth.

4. The combination, with vessel A, provided with gage E and a lifting-handle, and having a funnel-shaped bottom provided with a valve or described equivalent, having handle $D^2$ extended to above the upper end of the vessel, of the adjustable stand F, connected with the vessel so as to be raised or lowered at will in relation to the discharge end of the nozzle $b$ of the vessel, all substantially as described, for the operations and purposes set forth.

LEWIS H. SMITH.

Witnesses:
CHARLES SELKIRK,
ALEX. SELKIRK.